United States Patent
Lee et al.

(10) Patent No.: US 9,894,466 B2
(45) Date of Patent: Feb. 13, 2018

(54) METHOD AND APPARATUS FOR DETERMINING SILENCE TIME

(71) Applicant: MEDIATEK INC., Hsin-Chu (TW)

(72) Inventors: Yu-Ju Lee, Miaoli County (TW);
Po-Hsun Huang, New Taipei (TW);
Chao-Wen Chou, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 216 days.

(21) Appl. No.: 14/791,488

(22) Filed: Jul. 6, 2015

(65) Prior Publication Data
US 2016/0119918 A1    Apr. 28, 2016

Related U.S. Application Data

(60) Provisional application No. 62/068,002, filed on Oct. 24, 2014.

(51) Int. Cl.
*H04W 72/00* (2009.01)
*H04W 4/00* (2009.01)
*H04W 72/12* (2009.01)

(52) U.S. Cl.
CPC ....... *H04W 4/008* (2013.01); *H04W 72/1215* (2013.01)

(58) Field of Classification Search
CPC ............................ H04W 24/00; H04W 72/082
USPC ............................................... 455/450, 452.1
See application file for complete search history.

(56) References Cited

U.S. PATENT DOCUMENTS

| 6,243,391 | B1 | 6/2001 | Holmquist |
| 6,963,549 | B1 * | 11/2005 | Jayaraman ............ H04W 28/18 370/328 |
| 2006/0239272 | A1 | 10/2006 | Heidari-Bateni |
| 2008/0089311 | A1 | 4/2008 | Roy |
| 2009/0287827 | A1 * | 11/2009 | Horn ....................... H04L 41/12 709/227 |
| 2011/0258214 | A1 | 10/2011 | Shu |
| 2012/0287849 | A1 | 11/2012 | Wilczewski |
| 2013/0109301 | A1 | 5/2013 | Hakola |
| 2015/0057006 | A1 * | 2/2015 | Gao ....................... H04W 72/04 455/450 |

FOREIGN PATENT DOCUMENTS

| CN | 102090132 A | 6/2011 |
| CN | 103188742 A | 7/2013 |
| CN | 103813469 A | 5/2014 |
| WO | 2013067686 A1 | 5/2013 |

\* cited by examiner

*Primary Examiner* — Chuck Huynh
(74) *Attorney, Agent, or Firm* — Winston Hsu

(57) ABSTRACT

A transmission method comprises: connecting a first wireless device to a second wireless device; determining by the first wireless device whether a silence time is assigned to the second wireless device; setting a communication period with the second wireless device according to the assigned silence time if the silence time assigned to the second wireless device is recorded in the first wireless device; and determining by the first wireless device the silence time according to a traffic transmitted from the second wireless device if the silence time assigned to the second wireless device is not recorded in the first wireless device.

18 Claims, 8 Drawing Sheets

METHOD AND APPARATUS FOR DETERMINING SILENCE TIME

CROSS REFERENCE TO RELATED APPLICATIONS

This application claims the benefit of U.S. provisional application No. 62/068,002, filed on Oct. 24, 2014 and incorporated herein by reference.

BACKGROUND

The present invention relates to a method and an apparatus for determining a silence time of a wireless system, and more particularly to a method and an apparatus for dynamically adjusting a silence time of an un-predicted wireless system.

In wireless communications system, when a first peer device is communicated with a plurality of second peer devices concurrently, the first peer device needs to assign a communications period for each of the salve wireless devices. In other words, the first peer device needs to schedule the plurality of second peer devices. The scheduling between the plurality of second peer devices is an importance issue because this may affect the efficiency of the communications between the first peer device and the plurality of second peer devices. One of the challenges to schedule different time periods for the plurality of second peer devices is that some of the second peer devices may be the un-predicted wireless system, such as the wireless device in conforming to the specification of IEEE 802.11. For the slotted based wireless systems, i.e. predicted wireless system, such as Bluetooth and LTE (Long Term Evolution) systems, the traffic time for an incoming data is predetermined, therefore the scheduler in the first peer device can reserve predetermined time periods for the slotted based wireless systems. However, for the un-predicted wireless systems, the first peer device needs to estimate a time period of the incoming data such that no incoming data is transmitted to the first peer device before switching to communicate with other wireless device. Normally, before the first peer device switching to communicate with other wireless device from the un-predicted wireless system, the scheduler of the first peer device will set a silence time for the un-predicted wireless system in order to keep receiving the remaining data from the un-predicted wireless system. However, for different un-predicted wireless systems, the silence times are also different. If the silence time is set too large, then the time period of the un-predicted wireless system will be reduced. If the silence time is set too small, then the remaining data from the un-predicted wireless system may loss. Therefore, providing a method to determine an appropriate silence time for a wireless device to increase the efficiency of the wireless system is an urgent problem in this field.

SUMMARY

One of the objectives of the present embodiment is to provide a method and an apparatus for dynamically adjusting a silence time of an un-predicted wireless system.

According to a first embodiment of the present invention, a transmission method is disclosed. The transmission method comprises: connecting a first wireless device to a second wireless device; determining by the first wireless device whether a silence time is assigned to the second wireless device; setting a communication period with the second wireless device according to the assigned silence time if the silence time assigned to the second wireless device is recorded in the first wireless device; and determining by the first wireless device the silence time according to a traffic transmitted from the second wireless device if the silence time assigned to the second wireless device is not recorded in the first wireless device.

According to a second embodiment of the present invention, an transmission is disclosed. The transmission apparatus comprises: a scheduler, arranged to connect a first wireless device to a second wireless device; and a processing device, arranged to determine whether a silence time is assigned to the second wireless device; wherein if the processing device determines the first wireless device has recorded the silence time assigned to the second wireless device, the scheduler uses the silence time to set a communication period with the second wireless device according to the assigned silence time if the silence time assigned to the second wireless device is recorded in the first wireless device, and determine the silence time according to a traffic transmitted from the second wireless device if the silence time assigned to the second wireless device is not recorded in the first wireless device.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
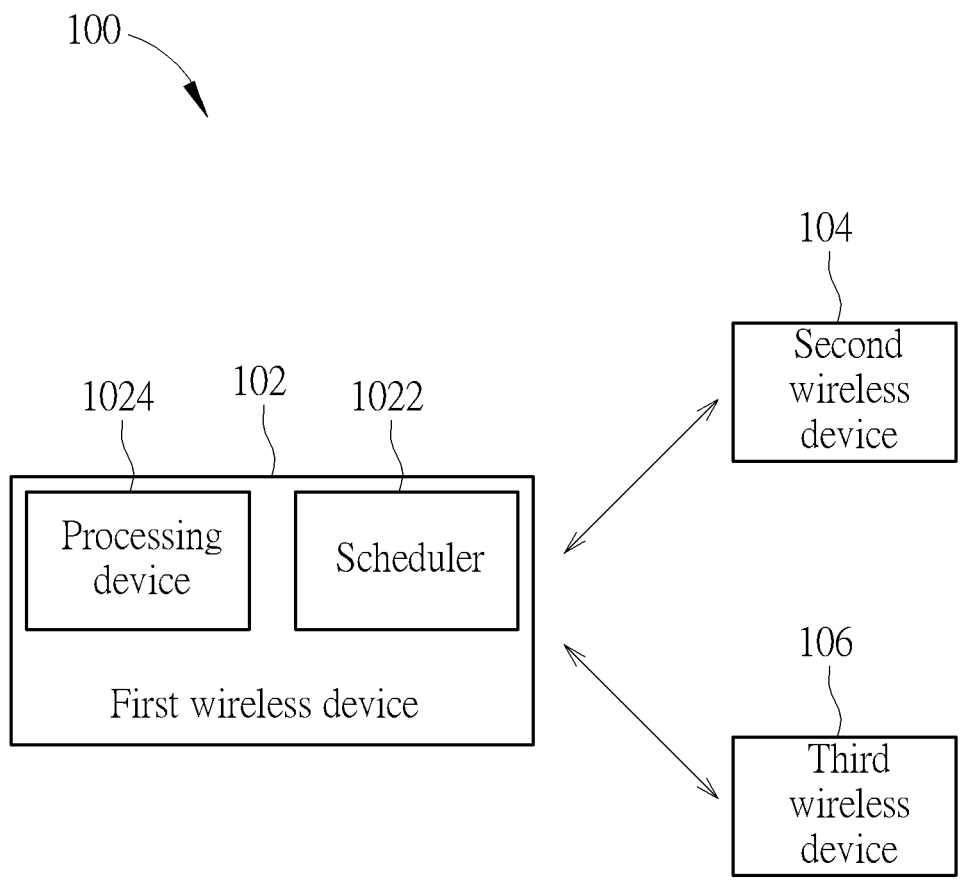
FIG. 1 is a diagram illustrating a wireless communications system having a first wireless device to wirelessly communicate with a second wireless device and a third wireless device according to an embodiment of the present invention.

Please refer to FIG. 1, which is a diagram illustrating a wireless communications system 100 having a first wireless device 102 to wirelessly communicate with a second wireless device 104 and a third wireless device 106 according to an embodiment of the present invention. The first wireless device 102 may be a peer device, and the second and third wireless devices 104, 106 may be another two peer devices. It is noted that the wireless communications system 100 as shown in FIG. 1 is just an exemplary embodiment, and not a limitation of the present invention. The first wireless device 102 may communicate with only one or a plurality of peer devices.

According to this embodiment, the second wireless device 104 is an un-predicted wireless device. The third wireless device 106 can be an un-predicted wireless device or a predicted wireless device. For example, the second wireless device 104 may be a wireless device in conforming to the specification of IEEE 802.11, and the third wireless device 106 may be a Bluetooth or LTE (Long Term Evolution) device. More specifically, for the slotted based wireless device like Bluetooth system and LTE system, which are predicted wireless devices, the traffic time is predetermined. Therefore, when a wireless device communicates with the slotted based wireless device, the scheduler of the wireless device could reserve a suitable time period for the slotted based wireless device such that the wireless device can receive the complete incoming traffic (e.g. frames or packets) transmitted from the slotted based wireless device. However, when the wireless device communicates with the un-predicted wireless device, such as the IEEE 802.11 system, the wireless device needs to estimate the silence time for the un-predicted wireless device after the wireless device indicates the un-predicted wireless device to stop the traffic. The silence time is the time interval used for receiving the remaining data (i.e. frames or packets) transmitted by the un-predicted wireless device after the un-predicted wireless device is told to stop the transmission. Ideally, there is no incoming traffic after the silence time, and then the wireless device can switch to communicate with other wireless devices. It is noted that the terms "un-predicted" and "predicted" are merely used to distinguish the wireless devices with different silence time characteristics.

Figure 2:
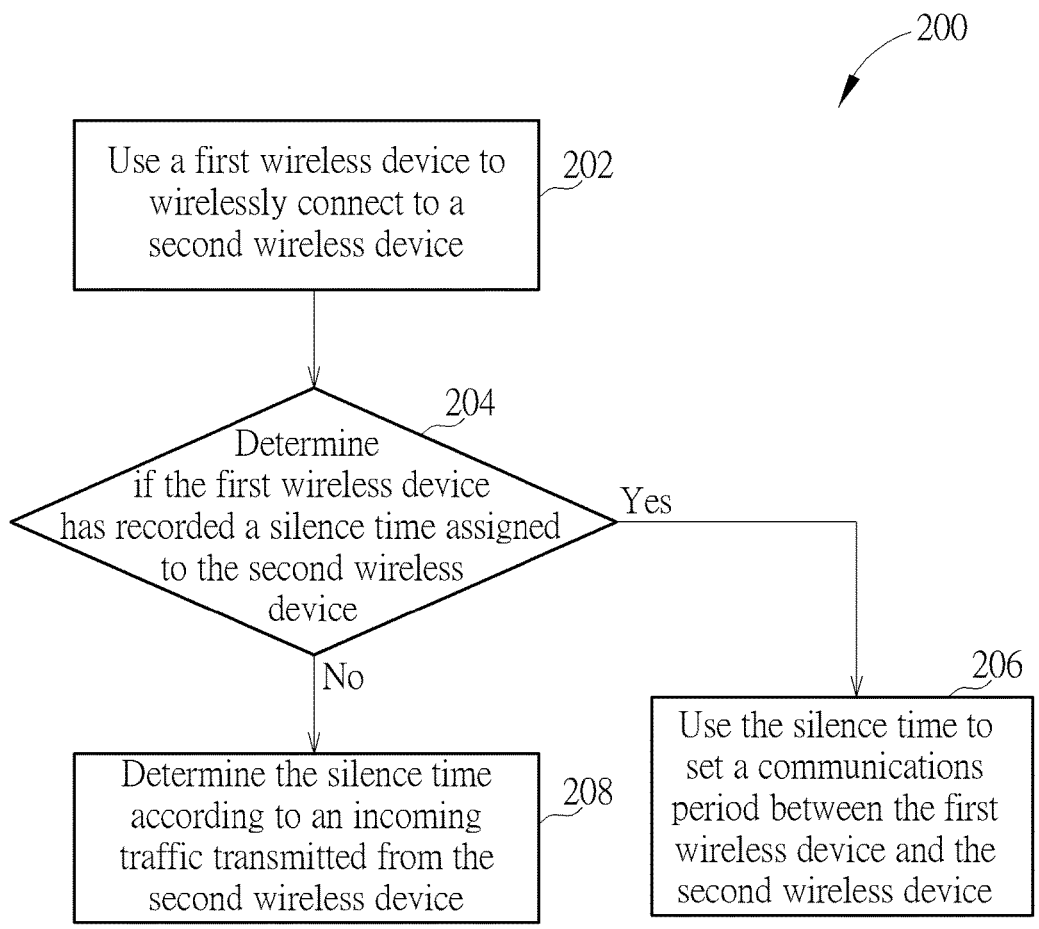
FIG. 2 is a flowchart illustrating a method for determining a silence time of the second wireless device by the first wireless device according to an embodiment of the present invention.

Please refer to FIG. 2, which is a flowchart illustrating a method 200 for determining the silence time Ts of the second wireless device 104 by the first wireless device 102 according to an embodiment of the present invention. Provided that substantially the same result is achieved, the steps of the flowchart shown in FIG. 2 need not be in the exact order shown and need not be contiguous; that is, other steps can be intermediate. The method 200 comprises:

Step 202: Use the first wireless device 102 to wirelessly connect to the second wireless device 104;

Step 204: Determine if the first wireless device 102 has recorded the silence time Ts assigned to the second wireless device 104, if yes, go to step 206, if no, go to step 208;

Step 206: Use the silence time Ts to set the communications period between the first wireless device 102 and the second wireless device 104;

Step 208: Determine the silence time Ts according to the incoming traffic transmitted from the second wireless device 104.

According to the method 200, when the first wireless device 102 wirelessly connects to the second wireless device 104, an un-predicted wireless device, the scheduler 1022 in the first wireless device 102 needs to set an appropriate silence time (i.e. the silence time Ts) for the second wireless device 104. In step 202, the first wireless device 102 determines if the silence time Ts has recorded therein. If the silence time Ts assigned for the second wireless device 104 is stored in the first wireless device 102, the first wireless device 102 directly loads the stored silence time Ts to set the communications period of the second wireless device 104. If the silence time Ts assigned for the second wireless device 104 is not stored in the first wireless device 102, the first wireless device 102 needs to determine the silence time Ts of the second wireless device 104.

Figure 3:
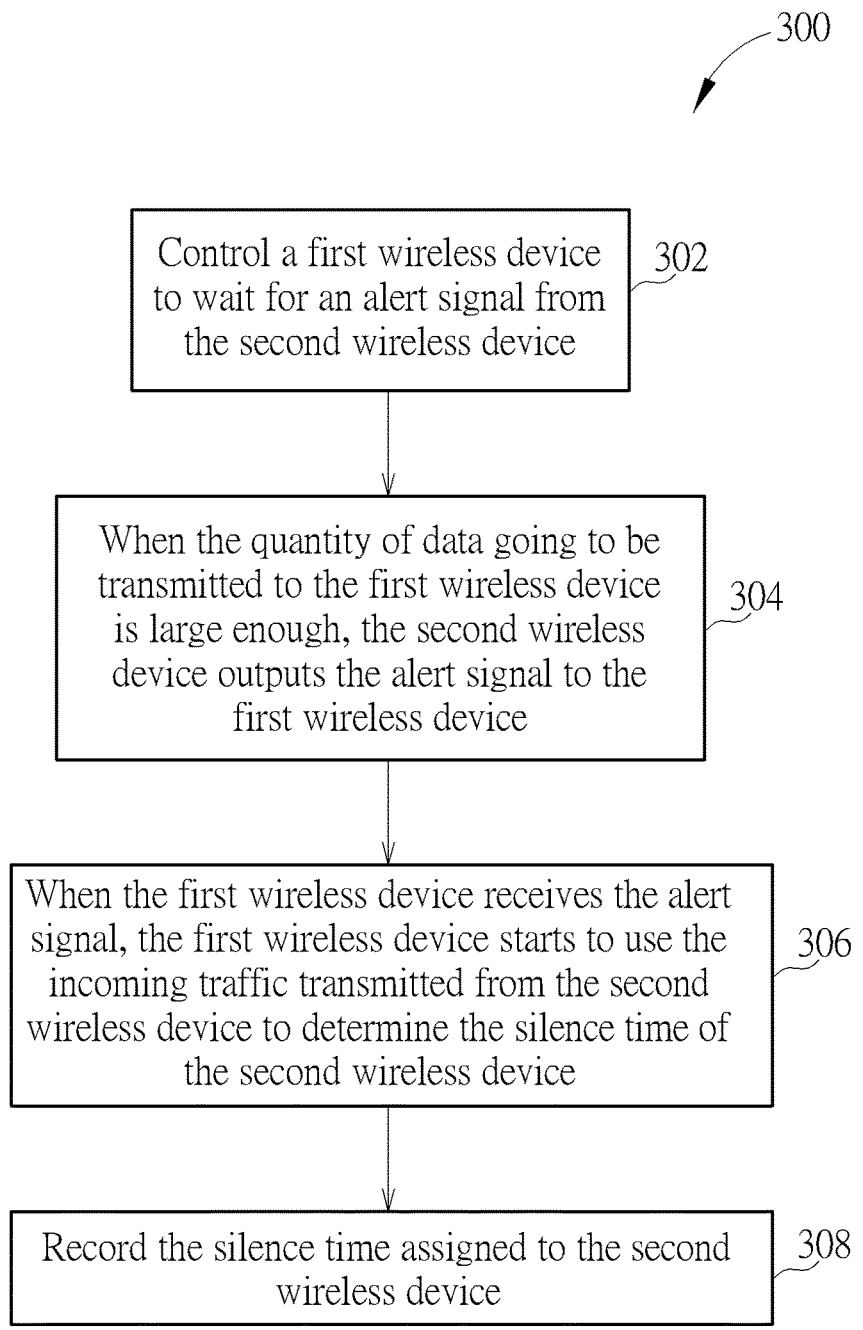
FIG. 3 is a flowchart illustrating a method to determine if the silence time can be measured according to an embodiment of the present invention.

In step 208, the first wireless device 102 does not immediately determine the silence time Ts of the second wireless device 104 after acknowledges that the silence time Ts is not stored in the first wireless device 102. On the contrary, the first wireless device 102 waits until the quantity of data being transmitted by the second wireless device 104 is large enough to determine the silence time Ts. FIG. 3 is a flowchart illustrating a method 300 to determine if the silence time Ts can be measured according to an embodiment of the present invention. The method 300 comprises:

Step 302: Control the first wireless device 102 to wait for an alert signal from the second wireless device 104;

Step 304: When the quantity of data going to be transmitted to the first wireless device 102 is large enough, the second wireless device 104 outputs the alert signal to the first wireless device 102;

Step 306: When the first wireless device 102 receives the alert signal, the first wireless device 102 starts to use the incoming traffic transmitted from the second wireless device 104 to determine the silence time Ts of the second wireless device 104;

Step 308: Record the silence time Ts assigned to the second wireless device 104.

According to the method 300, the second wireless device 104 may determine if the quantity of data going to be transmitted reaches a threshold quantity within a predetermined interval. If the quantity of data going to be transmitted reaches the threshold quantity within the predetermined interval, the second wireless device 104 acknowledges that the quantity of data is large enough. Then, the second wireless device 104 outputs the alert signal to the first wireless device 102. It is noted that the present invention is not limited to the above determination method, other methods capable of determining the quantity of data also belongs to the scope of the present invention.

Figure 4:
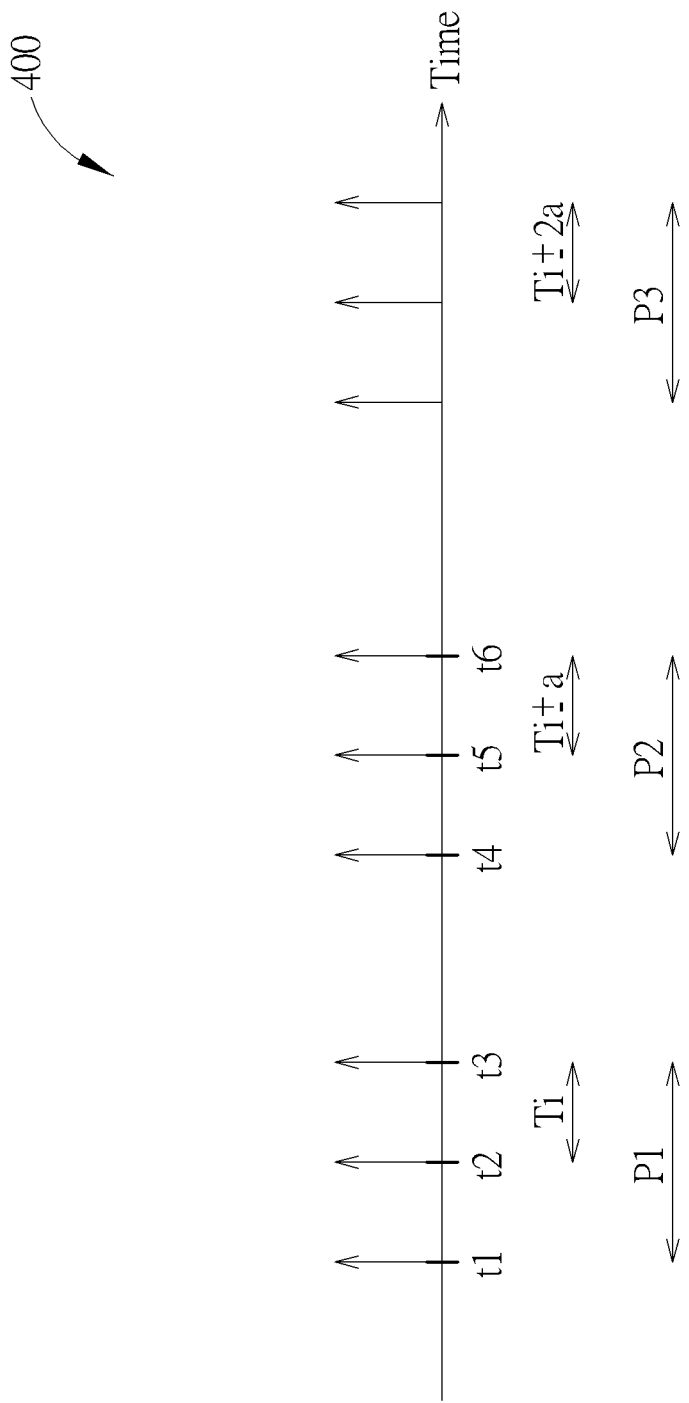
FIG. 4 is a timing diagram illustrating a training sequence for determining the silence time of the second wireless device after receiving an alert signal according to a first embodiment of the present invention.

Please refer to FIG. 4, which is a timing diagram illustrating a training sequence 400 for determining the silence time Ts of the second wireless device 104 after receiving the alert signal according to a first embodiment of the present invention. At time t1, the first wireless device 102 alerts the second wireless device 104 to start the incoming traffic, i.e. alerts the second wireless device 104 to start transmit packet or frame to the first wireless device 102 via wireless signal. Then, the first wireless device 102 starts to receive the data transmitted by the second wireless device 104. At time t2, the first wireless device 102 indicates or alerts the second wireless device 104 to stop the incoming traffic. As the second wireless device 104 still needs some time to transmit the remaining data buffered in the transmitter to the first wireless device 102, the second wireless device 104 may not immediately stop the incoming traffic at time t2. Initially, according to the embodiment, the scheduler 1022 in the first wireless device 102 sets an initial silence time Ti for the first wireless device 102 to make the first wireless device 102 keep receiving data for time Ti after the time t2.

Then, at time t3, the first wireless device 102 ends the first communications period P1, and the first wireless device 102 enters the second communications period P2 after time t3. According to the embodiment, the first wireless device 102 is arranged to detect if any data (i.e. incoming traffic) generated by the second wireless device 104 is received during the second communications period P2. If the first wireless device 102 still receives the incoming traffic via the wireless signal after the initial silence time Ti, meaning that the initial silence time Ti is too short for the second wireless device 104. Then, the scheduler 1022 in the first wireless device 102 is arranged to increase the initial silence time Ti by a predetermined unit interval Ta, i.e. Ts=Ti+Ta. On the other hand, if the first wireless device 102 does not receive the incoming traffic via the wireless signal after the initial silence time Ti, meaning that the initial silence time Ti may too large for the second wireless device 104. Then, the scheduler 1022 is arranged to decrease the initial silence time Ti by the predetermined unit interval Ta, i.e. Ts=Ti−Ta.

Then, at time t4, i.e. during the third communications period P3, the first wireless device 102 alerts the second wireless device 104 to start the incoming traffic again. At time t5, the first wireless device 102 indicates or alerts the second wireless device 104 to stop the incoming traffic. At this time, the scheduler 1022 in the first wireless device 102 uses the updated silence time Ts (e.g. Ti+Ta or Ti−Ta) to schedule the first wireless device 102 to make the first wireless device 102 keep receiving data for time Ts after the time t5. Then, the first wireless device 102 detects if any data (i.e. incoming traffic) generated by the second wireless device 104 is received during the fourth communications period P4 to determine if the updated silence time Ts is too short or too large. If the updated silence time Ts is too short, the scheduler 1022 increases the updated silence time Ts by the predetermined unit interval Ta. If the updated silence time Ts is too large, the scheduler 1022 decreases the updated silence time Ts by the predetermined unit interval Ta. Then, the first wireless device 102 uses the updated silence time to repeat the above procedure until the silence time is adjusted to be an appropriate value.

More specifically, if the updated silence time Ts is too short initially, then the first wireless device 102 uses the updated silence time to repeat the above procedure until the incoming traffic is not detected. Then, the latest silence time can be regarded as the appropriate silence time for the second wireless device 104. On the other hand, if the updated silence time Ts is too large initially, then the first wireless device 102 uses the updated silence time to repeat the above procedure until the incoming traffic is detected. Then, the latest silence time can be regarded as the appropriate silence time for the second wireless device 104.

When the appropriate silence time Ts is determined, the silence time Ts is then stored into a memory of the first wireless device 102. The silence time Ts may be directly loaded by the scheduler 1022 if the first wireless device 102 communicates with the second wireless device 104 again.

Figure 5:
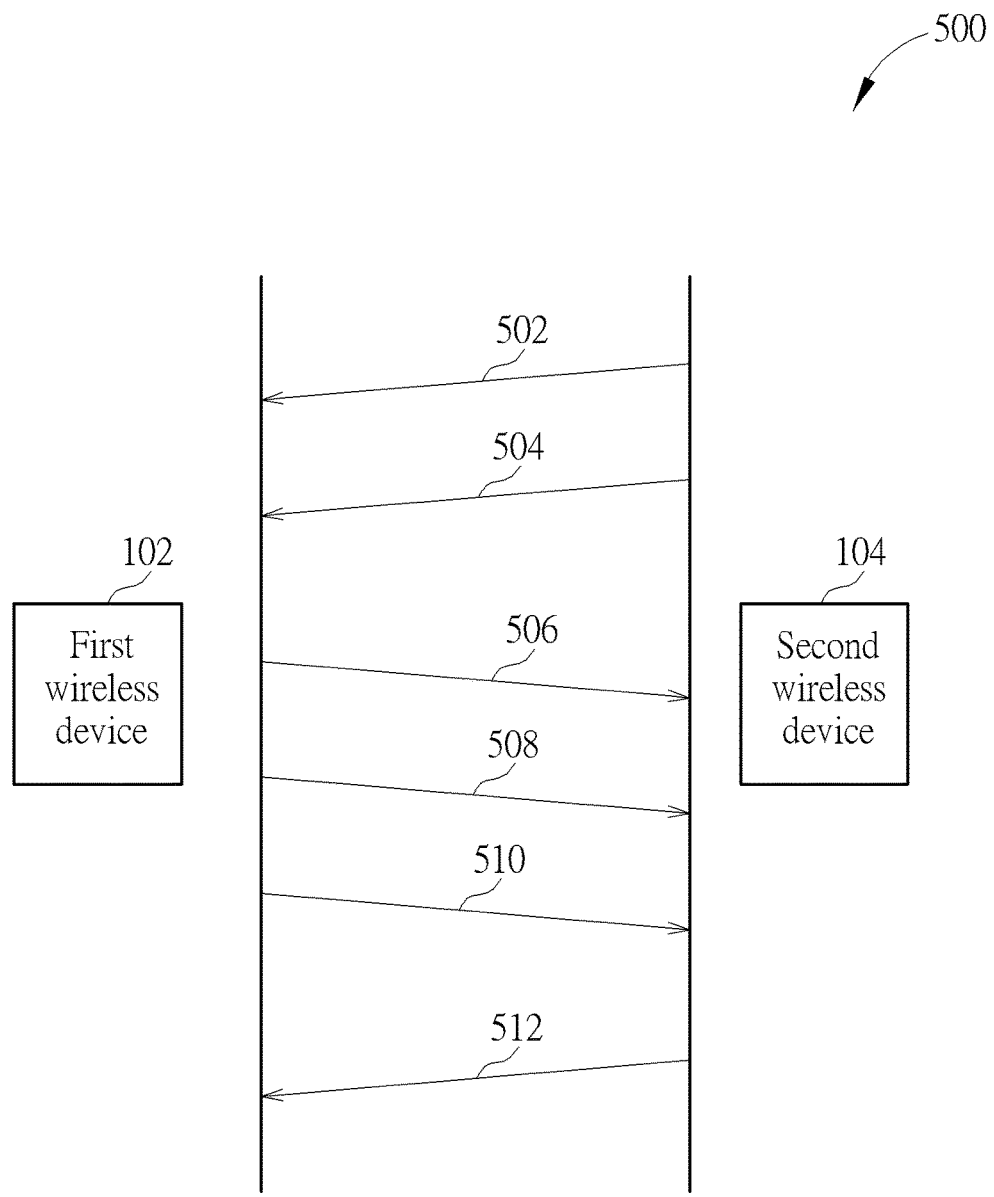
FIG. 5 is a diagram illustrating a simplified hand-shaking process to determine the silence time of the second wireless device by the first wireless device according to an embodiment of the present invention.

Please refer to FIG. 5, which is a diagram illustrating a simplified hand-shaking process 500 to determine the silence time Ts of the second wireless device 104 by the first wireless device 102 according to an embodiment of the present invention. The arrow 502 represents the second wireless device 104 is wirelessly connected to the first wireless device 102. The arrow 504 represents the quantity of data is transmitted by the second wireless device 104 is large enough to determine the silence time Ts. The arrow 506 represents that the first wireless device 102 informs the second wireless device 104 to start the incoming traffic, i.e. to enter the first communications period P1. The arrow 508 represents that the first wireless device 102 informs the second wireless device 104 to stop the incoming traffic. The arrow 510 represents that the first wireless device 102 enters the second communications period P2. The arrow 512 represents that if the incoming traffic transmitted from the second wireless device 104 is detected by the first wireless device 102 during the second communications period P2.

According to the embodiment, the training sequence 400 may be implemented by a software program installed in the first wireless device 102. However, this is not a limitation of the present invention. The training sequence 400 may also be implemented by a hardware circuit or a firmware in the first wireless device 102.

Figure 6:
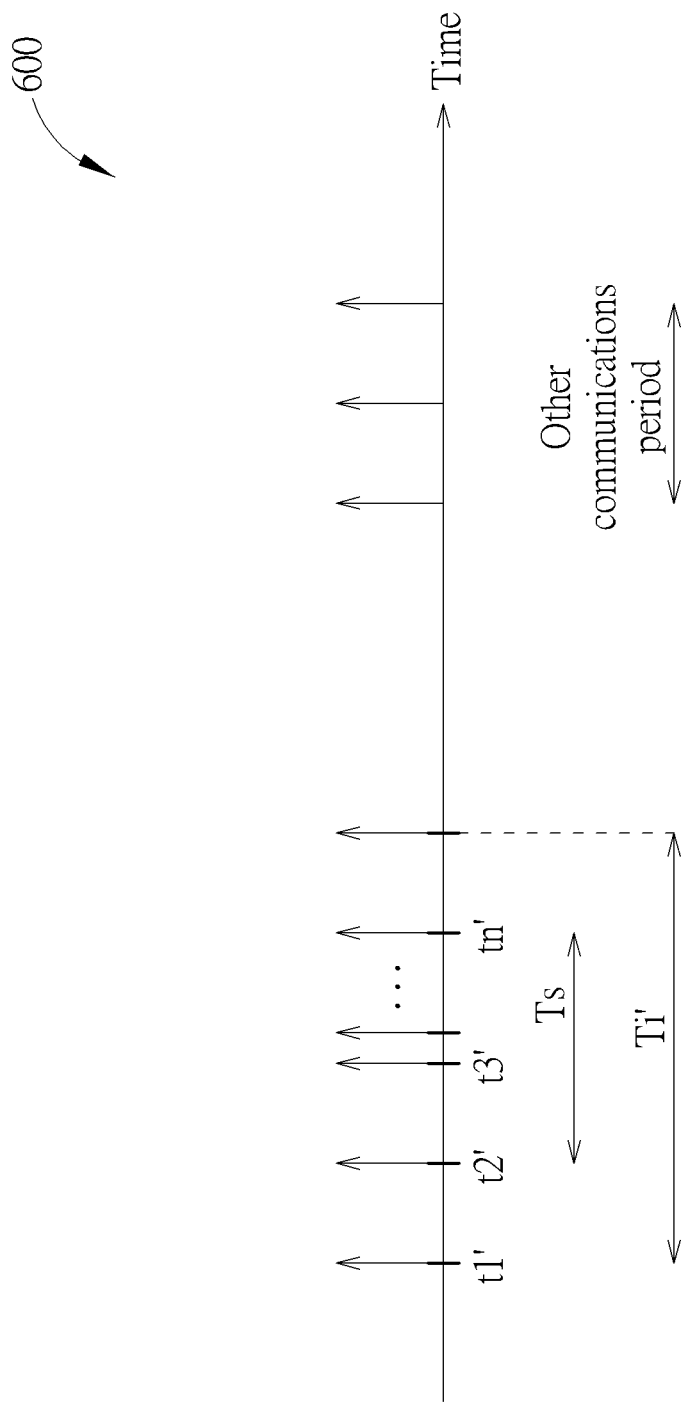
FIG. 6 is a timing diagram illustrating a training sequence for determining the silence time of the second wireless device after receiving the alert signal according to a second embodiment of the present invention.

Please refer to FIG. 6, which is a timing diagram illustrating a training sequence 600 for determining the silence time Ts of the second wireless device 104 after receiving the alert signal according to a second embodiment of the present invention. At time t1', the first wireless device 102 alerts the second wireless device 104 to start the incoming traffic, i.e. alerts the second wireless device 104 to start transmit packet or frame to the first wireless device 102 via wireless signal. Then, the first wireless device 102 starts to receive the data transmitted by the second wireless device 104. At time t2', the first wireless device 102 indicates or alerts the second wireless device 104 to stop the incoming traffic. As the second wireless device 104 still needs some time to transmit the remaining data buffered in the transmitter to the first wireless device 102, the second wireless device 104 may not immediately stop the incoming traffic at time t2'. Initially, according to the embodiment, the scheduler 1022 in the first wireless device 102 sets an initial silence time Ti' for the first wireless device 102 to make the first wireless device 102 keep receiving data for time Ti' after the time t2'. Meanwhile, the first wireless device 102 marks or records the responding times of every incoming traffics transmitted from the second wireless device 104 after the time t2'. The incoming traffics are the remaining data buffered in the second wireless device 102. As shown in FIG. 6, the responding times of the remaining incoming traffics received by the first wireless device 102 are t3'~tn' respectively. It is noted that the responding times t3'~tn' may be obtained by marking or recording the responding times of the first wireless device 102 transmitting a plurality of acknowledge signals to the second wireless device 104 when the remaining incoming traffics are received.

Then, the first wireless device 102 uses the last responding time tn' to calculate the silence time Ts. According to the embodiment, the silence time Ts is the time interval from t2' to tn', i.e. Ts=tn'−t2'.

In other words, the first wireless device 102 calculates the elapsed time (i.e. tn'−t2') starting from a time to indicate the second wireless device 104 to stop transmit the incoming traffic to the responding time tn' corresponding to the last incoming traffic received by the first wireless device 102. Then, the first wireless device 102 sets the elapsed time between the t2' and tn' to be the updated silence time Ts of the second wireless device 104.

It is noted that, if the value of tn'–t2' is larger than Ti', meaning that the initial silence time Ti' is set too short by the scheduler 1022 initially. Then, the first wireless device 102 may increase the initial silence time Ti' by a specific value and to repeat the above silence time determining process, or to directly set the value of tn'–t2' to be the silence time Ts of the second wireless device 104.

According to the embodiment, the training sequence 600 may be implemented by a hardware circuit in the first wireless device 102. However, this is not a limitation of the present invention. The training sequence 600 may also be implemented by a software program or a firmware installed in the first wireless device 102.

Figure 7:
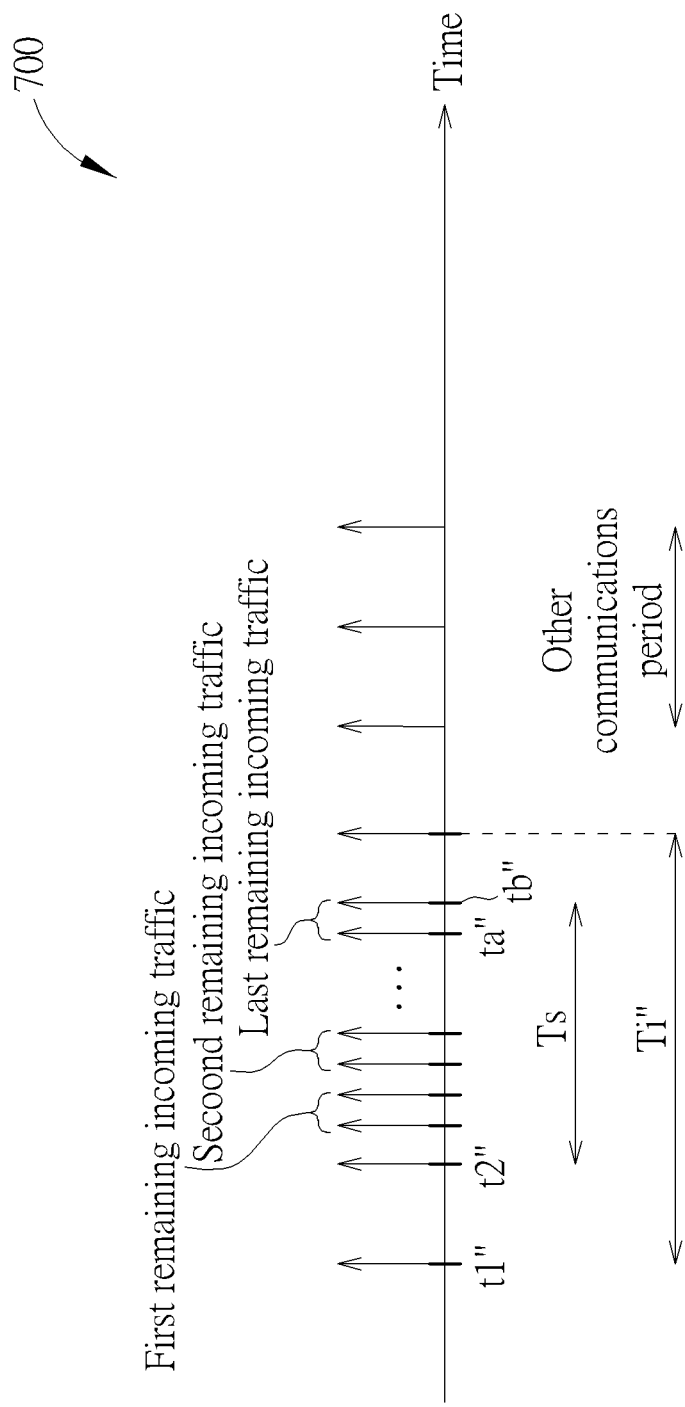
FIG. 7 is a timing diagram illustrating a training sequence for determining the silence time of the second wireless device after receiving the alert signal according to a third embodiment of the present invention.

Please refer to FIG. 7, which is a timing diagram illustrating a training sequence 700 for determining the silence time Ts of the second wireless device 104 after receiving the alert signal according to a third embodiment of the present invention. At time t1', the first wireless device 102 alerts the second wireless device 104 to start the incoming traffic, i.e. alerts the second wireless device 104 to start transmit packet or frame to the first wireless device 102 via wireless signal. Then, the first wireless device 102 starts to receive the data transmitted by the second wireless device 104. At time t2", the first wireless device 102 indicates or alerts the second wireless device 104 to stop the incoming traffic. As the second wireless device 104 still needs some time to transmit the remaining data buffered in the transmitter to the first wireless device 102, the second wireless device 104 may not immediately stop the incoming traffic at time t2". Initially, according to the embodiment, the scheduler 1022 in the first wireless device 102 sets an initial silence time Ti" for the first wireless device 102 to make the first wireless device 102 keep receiving data for time Ti" after the time t2". In other words, the first wireless device 102 keep receives every incoming traffics transmitted from the second wireless device 104 after the time t2". The incoming traffics are the remaining data buffered in the second wireless device 102.

When the first wireless device 102 receives the last incoming traffic transmitted from the second wireless device 104 after the time t2", the first wireless device 102 marks or records the receiving time ta" of the last incoming traffic. Then, the first wireless device 102 decodes the last incoming traffic to determine the ending traffic time tb" of the last incoming traffic. For example, the first wireless device 102 decodes the PLCP (Physical Layer Convergence Procedure) header of the last incoming traffic to determine the ending traffic time tb" of the last incoming traffic. Accordingly, the first wireless device 102 can calculate the silence time Ts of the second wireless device 104 by subtracting the time t2" by the ending traffic time tb", i.e. Ts=tb"–t2". When the silence time Ts is obtained, the first wireless device 102 updates the initial silence time Ti" by the silence time Ts. Therefore, the silence time Ts is the elapsed time from t2" to tb".

It is noted that, if the value of tb"–t2" is larger than Ti", meaning that the initial silence time Ti" is set too short by the scheduler 1022 initially. Then, the first wireless device 102 may increase the initial silence time Ti" by a specific value and to repeat the above silence time determining process, or to directly set the value of tb"–t2" to be the silence time Ts of the second wireless device 104.

According to the embodiment, the training sequence 700 may be implemented by a hardware circuit in the first wireless device 102. However, this is not a limitation of the present invention. The training sequence 700 may also be implemented by a software program or a firmware installed in the first wireless device 102.

Figure 8:
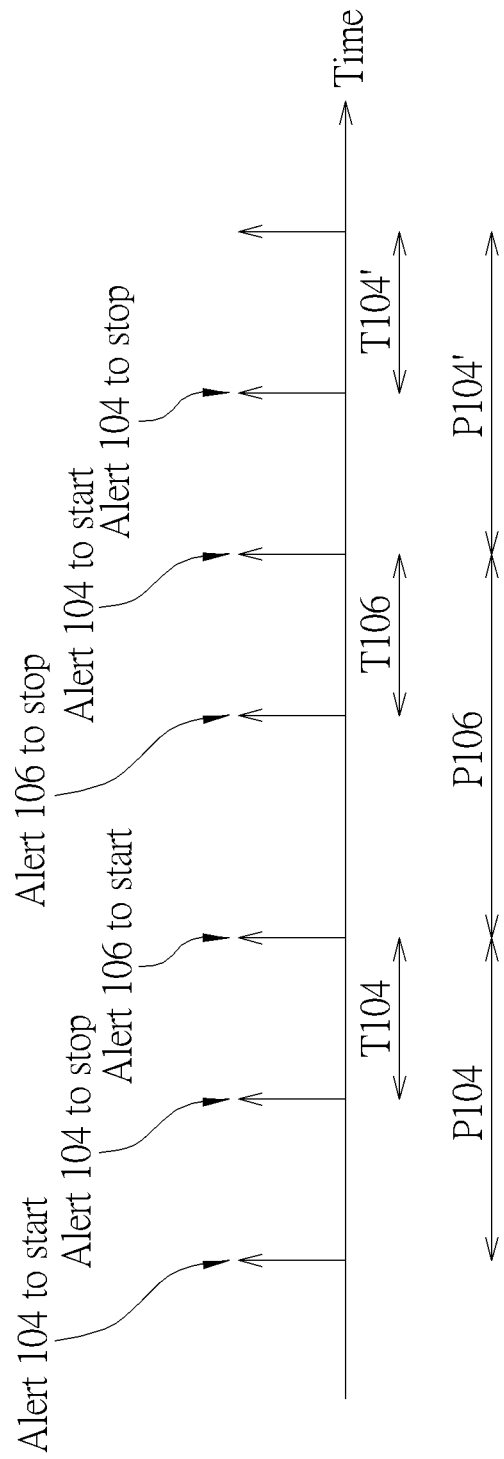
FIG. 8 is a timing diagram illustrating a scheduling of the first wireless device when the first wireless device communicates with the second wireless device and the third wireless device at the same time according to an embodiment of the present invention.

Please refer to FIG. 1 in conjunction with FIG. 8. FIG. 8 is a timing diagram illustrating the scheduling of the first wireless device 102 when the first wireless device 102 communicates with the second wireless device 104 and the third wireless device 106 at the same time according to an embodiment of the present invention. According to the embodiment, the second wireless device 104 is an un-predicted wireless device, and the third wireless device 106 can be a predicted or un-predicted wireless device. For brevity, the third wireless device 106 is a predicted wireless device. When the first wireless device 102 wirelessly connects to the second wireless device 104 and the third wireless device 106 at the same time, the scheduler 1022 in the first wireless device 102 schedules the communications periods P104 for the second wireless device 104 and schedules the communications periods P106 for the third wireless device 106. As the second wireless device 104 is the un-predicted wireless device, the first wireless device 102 uses any of the above provided methods to determine the silence time T104 of the second wireless device 104. It is noted that the silence time T106 of the third wireless device 106 is predetermined because the third wireless device 106 is a predicted wireless device. After the silence time T104 of the second wireless device 104 is determined by the present method, the first wireless device 102 can communicate with the second wireless device 104 and the third wireless device 106 at the same time according to the schedule of FIG. 8.

However, in case the first wireless device 102 still receives the incoming traffic transmitted from the second wireless device 104 after the first wireless device 102 enters the communications period P106, meaning that the calculated silence time T104 assigned for the second wireless device 104 is still too short. Then, the silence time T104 scheduled for the second wireless device 104 should be re-estimated by the present method. When this happens, the first wireless device 102 will repeat any of the above methods to re-estimate the silence time T104 of the second wireless device 104 in the next communication period, i.e. the silence time T104' in the communication period P104' as shown in FIG. 8.

Please refer to FIG. 1 again. According to the embodiment, the first wireless device 102 at least comprises a scheduler 1022 and a processing device 1024. The scheduler 1022 is arranged to control the first wireless device 102 to wireless connect to the second wireless device 104 according to the silence time Ts. The processing device 1024 is arranged to determine if the first wireless device 102 has recorded the silence time Ts assigned to the second wireless device 104. If the processing device 1024 determines the first wireless device 102 has recorded the silence time Ts assigned to the second wireless device 104, the scheduler 1022 uses the silence time Ts to set a communications period between the first wireless device 102 and the second wireless device 104, and if the processing device 1024 determines the first wireless device 102 has not recorded the silence time Ts assigned to the second wireless device 104, the processing device 1024 performs any of the above methods to determine the silence time Ts according to the incoming traffic transmitted from the second wireless device 104.

Therefore, in one embodiment, the processing device 1024 comprises: a determination unit arranged to determine if a quantity of data being transmitted by the second wireless device 104 is large enough to determine the silence time Ts; an indication unit arranged to indicate the first wireless device 102 to start determine the silence time Ts if the quantity of data being transmitted by the second wireless device 104 is large enough to determine the silence time Ts; and a recording unit arranged to record the silence time Ts assigned to the second wireless device 104. The determination unit is arranged to determine if the quantity of data being transmitted by the second wireless device 104 reaches a threshold quantity within a predetermined interval.

In another embodiment, the processing device 1024 comprises: a setting unit arranged to set the silence time to be an initial silence time Ti; an indicating unit arranged to indicate the second wireless device 104 to stop transmit the incoming traffic to the first wireless device 102; a determination unit arranged to determine if the first wireless device 102 receives the incoming traffic transmitted from the second wireless device 104 after the initial silence time Ti, wherein if the first wireless device 102 receives the incoming traffic transmitted from the second wireless device 104 after the initial silence time Ti, the determination unit updates the silence time Ts of the scheduler 1022 by increasing the initial silence time Ti by a predetermined unit interval Ta; and if the first wireless device 102 does not receive the incoming traffic transmitted from the second wireless device 104 after the initial silence time Ti, the determination unit updates the silence time Ts of the scheduler 1022 by decreasing the initial silence time Ti by a predetermined unit interval Ta.

In another embodiment, the processing device 1024 comprises: an indicating unit arranged to indicate the second wireless device 104 to stop transmit the incoming traffic to the first wireless device 102; a recording unit arranged to record a responding time corresponding to a last incoming traffic received by the first wireless device 102 after indicating the second wireless device 104 to stop transmit the incoming traffic to the first wireless device 102; and an updating unit arranged to update the silence time Ts of the scheduler 1022 according to the elapsed time. The updating unit sets the silence time Ts of the scheduler 1022 to be the responding time.

In another embodiment, the processing device 1024 comprises: an indicating unit arranged to indicate the second wireless device 104 to stop transmit the incoming traffic to the first wireless device 102; a recording unit arranged to record a receiving time Ta" of a last wireless signal received by the first wireless device 102 after indicating the second wireless device 104 to stop transmit the incoming traffic to the first wireless device 102; a decoding unit arranged to decode the last incoming traffic to determine an ending traffic time Tb" of the last incoming traffic; and an updating unit arranged to update the silence time Ts of the scheduler 1022 according to the ending traffic time tb" of the last incoming traffic.

Briefly, by monitoring and dynamically adjusting the silence time of an un-predicted wireless device according to the incoming traffic, a scheduler can schedule the communications period of a plurality of predicted/un-predicted wireless devices in more efficient way.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmission method, comprising:
   connecting a first wireless device to a second wireless device;
   determining by the first wireless device whether a silence time is assigned to the second wireless device;
   setting a communication period with the second wireless device according to the assigned silence time if the silence time assigned to the second wireless device is recorded in the first wireless device; and
   determining by the first wireless device the silence time according to a traffic transmitted from the second wireless device if the silence time assigned to the second wireless device is not recorded in the first wireless device;
   wherein the step of determining the silence time according to the incoming traffic transmitted from the second wireless device comprises:
      determining if a quantity of data being transmitted by the second wireless device is large enough to determine the silence time;
      indicating the first wireless device to start determine the silence time if the quantity of data being transmitted by the second wireless device is large enough to determine the silence time; and
      recording the silence time assigned to the second wireless device.

2. The transmission method of claim 1, wherein during the silence time, the first wireless device does not receive the incoming traffic transmitted from the second wireless device.

3. The transmission method of claim 1, wherein the communications period comprises a data traffic time and the silence time.

4. The transmission method of claim 1, wherein the step of determining if the quantity of data being transmitted by the second wireless device is large enough to determine the silence time comprises:
   determining if the quantity of data being transmitted by the second wireless device reaches a threshold quantity within a predetermined interval.

5. The transmission method of claim 1, wherein the step of determining the silence time according to the incoming traffic transmitted from the second wireless device comprises:
   setting the silence time to be an initial silence time;
   indicating the second wireless device to stop transmit the incoming traffic to the first wireless device;
   determining if the first wireless device receives the incoming traffic transmitted from the second wireless device after the initial silence time;
   if the first wireless device receives the incoming traffic transmitted from the second wireless device after the initial silence time, updating the silence time by increasing the initial silence time by a predetermined unit interval; and
   if the first wireless device does not receive the incoming traffic transmitted from the second wireless device after the initial silence time, updating the silence time by decreasing the initial silence time by a predetermined unit interval.

6. The transmission method of claim 1, wherein the step of determining the silence time according to the incoming traffic transmitted from the second wireless device comprises:
   indicating the second wireless device to stop transmit the incoming traffic to the first wireless device;
   recording a responding time of a last incoming traffic received by the first wireless device after indicating the second wireless device to stop transmit the incoming traffic to the first wireless device; and
   updating the silence time according to the responding time.

7. The transmission method of claim 6, wherein the step of updating the silence time according to the responding time comprises:
  setting the silence time to be an elapsed time starting from a time to indicate the second wireless device to stop transmit the incoming traffic to the responding time.

8. The transmission method of claim 6, wherein the responding time is a time of the first wireless device transmitting an acknowledge signal to the second wireless device when the last incoming traffic is received by the first wireless device.

9. The transmission method of claim 1, wherein the step of determining the silence time according to the incoming traffic transmitted from the second wireless device comprises:
  indicating the second wireless device to stop transmit the incoming traffic to the first wireless device;
  recording a receiving time of a last incoming traffic received by the first wireless device after indicating the second wireless device to stop transmit the incoming traffic to the first wireless device;
  decoding the last incoming traffic to determine an ending traffic time of the last incoming traffic according to the receiving time; and
  updating the silence time according to the ending traffic time of the last incoming traffic.

10. An transmission apparatus, comprising:
  a scheduler, arranged to connect a first wireless device to a second wireless device; and
  a processing device, arranged to determine whether a silence time is assigned to the second wireless device;
  wherein if the processing device determines the first wireless device has recorded the silence time assigned to the second wireless device, the scheduler uses the silence time to set a communication period with the second wireless device according to the assigned silence time if the silence time assigned to the second wireless device is recorded in the first wireless device, and determine the silence time according to a traffic transmitted from the second wireless device if the silence time assigned to the second wireless device is not recorded in the first wireless device, and the processing device comprises:
    a determination unit, arranged to determine if a quantity of data being transmitted by the second wireless device is large enough to determine the silence time;
    an indication unit, arranged to indicate the first wireless device to start determine the silence time if the quantity of data being transmitted by the second wireless device is large enough to determine the silence time; and
    a recording unit, arranged to record the silence time assigned to the second wireless device.

11. The transmission apparatus of claim 10, wherein during the silence time, the first wireless device does not receive the incoming traffic transmitted from the second wireless device.

12. The transmission apparatus of claim 10, wherein the communications period comprises a data traffic time and the silence time.

13. The transmission apparatus of claim 10, wherein the determination unit is arranged to determine if the quantity of data being transmitted by the second wireless device reaches a threshold quantity within a predetermined interval.

14. The transmission apparatus of claim 10, wherein the processing device further comprises:
  a setting unit, arranged to set the silence time to be an initial silence time;
  wherein the indicating unit is arranged to indicate the second wireless device to stop transmit the incoming traffic to the first wireless device; and the determination unit is arranged to determine if the first wireless device receives the incoming traffic transmitted from the second wireless device after the initial silence time, wherein if the first wireless device receives the incoming traffic transmitted from the second wireless device after the initial silence time, the determination unit updates the silence time of the scheduler by increasing the initial silence time by a predetermined unit interval; and if the first wireless device does not receive the incoming traffic transmitted from the second wireless device after the initial silence time, the determination unit updates the silence time of the scheduler by decreasing the initial silence time by a predetermined unit interval.

15. The transmission apparatus of claim 10, wherein the indicating unit is arranged to indicate the second wireless device to stop transmit the incoming traffic to the first wireless device, and the recording unit is arranged to record a responding time corresponding to a last incoming traffic received by the first wireless device after indicating the second wireless device to stop transmit the incoming traffic to the first wireless device, and the processing device further comprises:
  an updating unit, arranged to update the silence time of the scheduler according to the responding time.

16. The transmission apparatus of claim 15, wherein the updating unit sets the silence time to be an elapsed time starting from a time to indicate the second wireless device to stop transmit the incoming traffic to the responding time.

17. The transmission apparatus of claim 16, wherein the responding time is a time of the first wireless device transmitting an acknowledge signal to the second wireless device when the last incoming traffic is received by the first wireless device.

18. The transmission apparatus of claim 10, wherein the indicating unit, arranged to indicate the second wireless device to stop transmit the incoming traffic to the first wireless device, and the recording unit, arranged to record a receiving time of a last incoming traffic received by the first wireless device after indicating the second wireless device to stop transmit the incoming traffic to the first wireless device, and the processing device further comprises:
  a decoding unit, arranged to decode the last incoming traffic to determine an ending traffic time of the last wireless signal according to the receiving time; and
  an updating unit, arranged to update the silence time according to the ending traffic time of the last incoming traffic.

* * * * *